United States Patent
Wang et al.

(10) Patent No.: US 7,050,173 B2
(45) Date of Patent: May 23, 2006

(54) METHOD AND ARRANGEMENT FOR REMOVING NOISE AND MEASUREMENTS OF HEAD-MEDIA SPACING MODULATION FOR DIGITAL RECORDING

(75) Inventors: Jianmin Wang, Fremont, CA (US); Jason L. Pressesky, Menlo Park, CA (US)

(73) Assignee: Seagate Technology LLC, Scotts Valley, CA (US)

(*) Notice: Subject to any disclaimer, the term of this patent is extended or adjusted under 35 U.S.C. 154(b) by 275 days.

(21) Appl. No.: 10/781,697

(22) Filed: Feb. 20, 2004

(65) Prior Publication Data

US 2004/0252393 A1 Dec. 16, 2004

Related U.S. Application Data

(60) Provisional application No. 60/459,761, filed on Apr. 1, 2003.

(51) Int. Cl.
*G01B 9/02* (2006.01)

(52) U.S. Cl. .................................... 356/495

(58) Field of Classification Search ............... 356/491, 356/492, 493, 494, 495
See application file for complete search history.

(56) References Cited

U.S. PATENT DOCUMENTS

| | | | |
|---|---|---|---|
| 5,600,441 A * | 2/1997 | de Groot et al. ............. | 356/492 |
| 5,710,637 A * | 1/1998 | Matsumoto .................. | 358/400 |
| 5,999,261 A * | 12/1999 | Pressesky et al. .......... | 356/487 |
| 6,618,218 B1 * | 9/2003 | Kadowaki et al. ........ | 360/77.03 |
| 6,741,357 B1 * | 5/2004 | Wang et al. ................ | 356/493 |

* cited by examiner

*Primary Examiner*—Gregory J. Toatley, Jr.
*Assistant Examiner*—Michael A. Lyons
(74) *Attorney, Agent, or Firm*—McDermott Will & Emery LLP

(57) ABSTRACT

A method and arrangement for measuring head-media spacing modulation (HMS_Wq) employs a profilometer to measure the surface topography of a disk. A cumulative power spectral density (PSD) distribution is generated from the measured surface topography. Discontinuities and steps are identified in the PSD distribution. The discontinuities and steps are removed to create a corrected PSD distribution. A noise free spectrum is then reconstructed from the corrected PSD distribution.

20 Claims, 4 Drawing Sheets

METHOD AND ARRANGEMENT FOR REMOVING NOISE AND MEASUREMENTS OF HEAD-MEDIA SPACING MODULATION FOR DIGITAL RECORDING

RELATED APPLICATIONS

This Application claims priority to provisional Application Ser. No. 60/459,761 filed on Apr. 1, 2003, the entire disclosure of which is hereby incorporated by reference.

FIELD OF THE INVENTION

The present invention relates to characterizing the topography of a surface, and more particularly, to the removal of noise in the measurement of the head-media spacing modulation in the characterization of disk surface topography.

BACKGROUND OF THE INVENTION

A form of an information storage and retrieval device is a hard disk drive (hereinafter "disk drive"). A disk drive is conventionally used for information storage and retrieval with computers, data recorders, redundant arrays of independent disks (RAIDs), multi-media recorders, and the like. A disk drive comprises one or more disk media.

Each disk medium comprises a substrate upon which materials are deposited to provide a magnetically sensitive surface. In forming a disk medium, a substrate is ground or polished, conventionally by chemical-mechanical or mechanical polishing, to provide a substantially planar surface. Layers of materials are substantially uniformly deposited on the substantially planar surface to provide magnetic properties for writing to and reading from the disk media.

However, defects, such as pits, voids, particles, bumps, and scratches, among others, may arise on a disk medium surface. These defects affect the surface topography of the disk medium, and need to be detected and characterized. The characterization of disk surface topography is increasingly important due to the extreme reduction of head-to-media flying height spacing required to support ultra-high density digital magnetic recording. Research indicates that the disk micro-waviness, which is defined as topography in the wavelength range of 0.02 mm to 100 mm, has a substantial contribution to the head-disk separation margin, also known as disk contact (glide) avalanche. A model has been developed to predict glide avalanche of disk media from measurable properties of the media. A component of this model is HMS_Wq (r.m.s. Head-Media Spacing Modulation), which is calculated from the measurement of micro-waviness of the disk surface. To calculate HMS_Wq, the circumferential surface topography at a given radius on the disk is measured by use of high resolution surface profilometers, such as a Candela profilometer, quaduature phase shift interferometers (QPSI) or laser doppler vibrometers (LDV).

Measurement signals are provided to a processor that analyzes the spectrum of the surface topography by using Fast Fourier Transform (FFT). Integration of the product of the surface topography power spectral density (PSD) and an air bearing transfer function, evaluated over the micro-waviness wavelength range, determines the HMS_Wq. Taking an accurate and noise-free surface topography measurement is therefore a crucial step in the measurement of HMS_Wq. It has been observed that the measurement of the topography PSD spectrum is easily contaminated by noise sources, which may be electronic in origin or may originate from unwanted mechanical vibrations. Examples of such contaminating spectral components are shown in FIG. 1. It can be seen that these unwanted frequency components vary within the range of 1 kHz to 3 MHz. The existence of these noise sources in the surface topography PSD spectrum can severely affect the repeatability and reliability of the HMS_Wq measurements. A problem exists in that conventional filtering techniques cannot be applied because the noise is in the frequency band of interest.

SUMMARY OF THE INVENTION

There is a need for a methodology and arrangement for removing the noise from the surface topography PSD spectrum to provide accurate head-media spacing modulation measurements.

This and other needs are met by embodiments of the present invention which provide a method of measuring head-media spacing modulation (HMS_Wq), comprising the steps of measuring surface topography of a disk, and generating a cumulative power spectral density (PSD) distribution from the measured surface topography of the disk. Discontinuities and steps in the cumulative PSD distribution are identified. The discontinuities and steps in the cumulative PSD distribution are then removed.

The earlier stated needs are met by other aspects of the present invention which provide an arrangement for measuring HMS_Wq, comprising a measurement device that performs surface topography measurements of a disk, and a processor. In embodiments of the invention, the processor is configured to determine an initial surface topography power spectral density (PSD) spectrum based on the topography measurements. The processor is further configured to remove noise from the initial PSD spectrum and generate an amplitude r.m.s. of surface topography $\hat{F}(k)$ on the PSD spectrum with noise removed. The processor is also configured to calculate HMS_Wq from $\hat{F}(k)$.

The earlier stated needs are met by still further embodiments of the present invention which provide an arrangement for measuring surface topography of a disk comprising a measurement device to obtain surface topography measurements of a disk surface, and means for determining head-media spacing modulation (HMS_Wq) with noise removed.

The foregoing and other features, aspects and advantages of the present invention will become more apparent from the following detailed description of the present invention when taken in conjunction with the accompanying drawings.

DETAILED DESCRIPTION OF THE INVENTION

The present invention addresses and solves problems related to the r.m.s. head-media spacing modulation due to noise sources in the surface topography power spectral density spectrum. The present invention overcomes these problems, in part, by providing methods and arrangements for measuring head-media spacing modulation (HMS_Wq) that includes measuring the surface topography of a disk and generating a cumulative power spectral density (PSD) distribution from this measured surface topography. Discontinuities and steps in the cumulative PSD distribution are identified and then removed. A slope detection method is employed to find the rising and ending points of the discontinuities and steps. From this, a first step height is calculated in the power spectral density distribution. The segments of the cumulative PSD distribution are then moved vertically by the step height to remove the steps from the cumulative PSD distribution. This is continued until all of the steps in the cumulative PSD distribution are removed. From this noise-removed cumulative PSD distribution, the amplitude r.m.s. of surface topography after the noises are removed is then determined.

The present invention can be embodied in a number of different arrangements, which employ different types of measurement devices. For example, the invention can be applied to measuring the surface topography with a Candela profilometer or a laser doppler vibrometer. For purposes of explanation, an exemplary embodiment of a quadrature phase shift interferometer will be described with respect to FIGS. 5–6. However, the invention may be applied to other profilometers and arrangements for measuring surface topography of a hard disk surface, as will be recognized by one of ordinary skill in the art.

Figure 5:
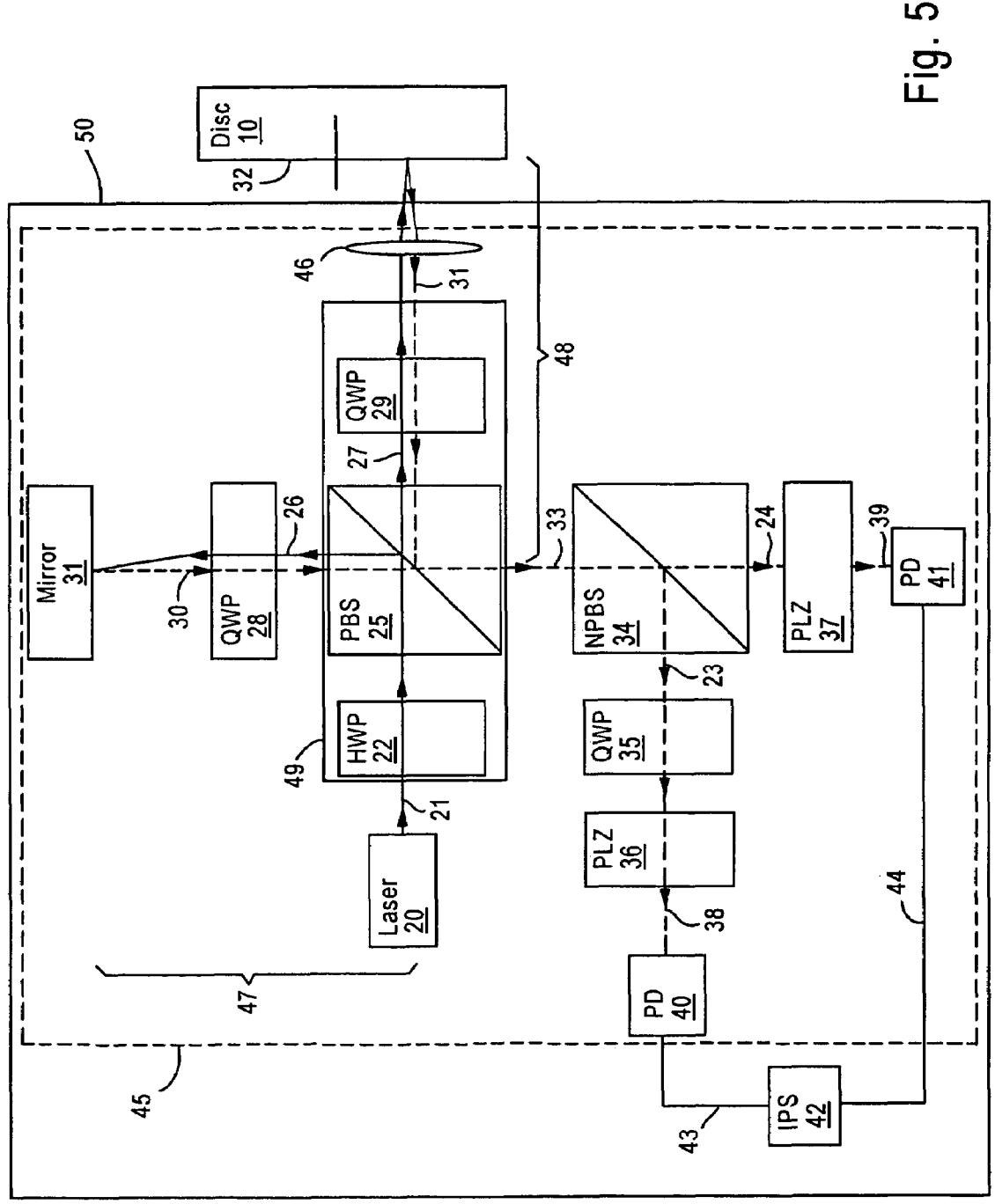
FIG. 5 is an exemplary embodiment of a QPSI detector that may be employed in the present invention.

FIG. 5 is an optical layout of an exemplary portion of an embodiment of an interferometer system 50 in accordance with one or more aspects of the present invention. As will be understood, interferometer system 50, or more particularly quadrature phase shift interferometer 45, uses two polarization processes to create two independent interference signals, which are phase shifted with respect to one another. The presence of two independent signals in phase quadrature facilitates unwrapping of phase.

With continuing reference to FIG. 5, laser or laser beam source 20 is configured to provide a laser or other optical energy beam 21. Laser 20 may be configured to provide a linearly polarized laser beam. For example, a Helium-Neon (He-Ne) laser may be used, though it should be understood that the present invention may be used with known lasers of other wavelengths. Laser beam 21 is a linearly polarized laser beam. Laser beam 21 is provided to variable ratio beam splitter 49.

Variable ratio beam splitter 49 comprises a polarizing beam splitter (PBS) 25 and half-wave plate (HWP) 22. Notably, half-wave plate 22 is configured to rotate. By rotating half-wave plate 22, relative intensity or amplitude of reference beam 26 and object beam 27 may be adjusted. Half-wave plate 22 is used to rotate the direction of polarization of laser beam 21 with respect to polarizing beam splitter 25. In other words, direction of orientation is adjusted such that polarizing beam splitter receives components of s-polarization and p-polarization. Laser beam 21 is provided to half-wave plate 22 and then to polarizing beam splitter 25. Polarizing beam splitter 25 splits laser beam 21 into a reference beam 26 and an object or measurement beam 27 according to s-polarization and p-polarization components. An aspect of the present invention is to balance intensity of reference beam 26 and object beam 27. Alternatively, half-wave plate 22 may be removed and direction of polarization controlled by rotation of laser 20.

Reference beam 26 and object beam 27 are polarized beams with polarizations perpendicular or orthogonal to one another. Thus, reference beam 26 may comprise only the s-polarized component of laser beam 21 and object beam 27 may comprise only the p-polarized component. Notably, reference beam 26 and object beam 27 are interchangeable.

Reference beam 26 is provided to quarter-wave plate (QWP) 28 and then to mirror 31. Reference beam 26 enters a passive side of quarter-wave plate 28. Reference beam 26 is reflected off an optically reflective surface of mirror 31 to provide reflected reference beam 30, as shown with a dashed line. For purposes of clarity, beams post-reflection and pre-recombination are shown with a dashed line.

Reflected reference beam 30 is provided to quarter-wave plate 28. Quarter-wave plate 28, as well as quarter waveplate 29, are used to reduce power loss due to subsequent combination of reflected reference beam 30 and reflected object beam 31, respectively. Reference beam 26 immediately prior to passing through quarter-wave plate 28 comprises only linear polarization, namely s-polarization, components. After passing through quarter-wave plate 28, reference beam 26 linear polarization components are converted to circular polarization components. Reflected reference beam 30 immediately prior to passing through quarter-wave plate 28 comprises only circular polarization components. After passing through quarter-wave plate 28, reflected reference beam 30 circular polarization components are converted to linear polarization, namely p-polarization, components, and thus reflected reference beam with p-polarization components passes straight through polarizing beam splitter 25 for providing a portion of combinative beam 33.

Object beam 27 is provided to a passive side of quarter-wave plate 29 and then to lens 46. Lens 46 is used to reduce spot size of object beam 27 for imaging off of surface 32 of disc medium 10. Spot size determines resolution for inspection purposes, and thus a smaller spot size allows smaller defects to be resolved. Focused object beam 27 from lens 46 leaves interferometer system 50 and then is reflected from surface 32 to re-enter interferometer system 50 back to lens 46, where it is reset to approximately the same spot size prior to focusing. Disc 10 is a moving, such as rotating, target. From lens 46, reflected object beam 31 is provided to quarter-wave plate 29. Object beam 27 immediately prior to passing through quarter-wave plate 29 comprises only p-polarization components. After passing through quarter-wave plate 29, object beam 27 comprises only circular polarization components. Reflected object beam 31 immediately prior to passing through quarter-wave plate 29 comprises only circular polarization components. After passing through quarter-wave plate 29, reflected object beam 31 comprises only s-polarization components, and thus as reflected object beam 31 enters from a side opposite to that of original entry to polarizing beam splitter 25, it is orthogonal diverted by polarizing beam splitter 25 in a direction opposite to that of reference beam 26 for providing a portion of combinative beam 33.

Notably difference in optical path length 48 and optical path length 47 is less than laser beam coherence length. Furthermore, it should be understood that surface defects on surface 32 causes displacement in optical path length 48. For example depending on reference level, a depression lengthens optical path length 48, both with respect to object beam 27 and reflected object beam 31, while a bump shortens optical path length 48. Maximum allowed displacement is limited by focus depth of lens 46. Optical path length 48 is modulated by surface 32, if surface 32 is moving. Optical path length 48 is modulated by out-of-plane, or more particularly out-of-reference plane, movement of surface 32.

Reflected reference beam 30 and reflected object beam 31 are combined by polarizing beam splitter 25 to provide combinative beam 33. Combinative beam 33 comprises a reflected reference beam portion and a reflective object beam portion, as respective polarization directions of these portions are orthogonal. In other words, the reflected reference beam portion and the reflective object beam portion in combinative beam 33 do not interfere with one another.

Combinative beam 33 is provided from polarizing beam splitter 25 to non-polarizing beam splitter 34 (NPBS). Non-polarizing beam splitter 34 amplitude splits combinative beam 33 into output beam 23 and output beam 24.

One of output beam 23 or 24 is provided to a quarter-wave plate. In the embodiment shown in FIG. 5, output beam 23 is provided to quarter-wave plate 35. Quarter-wave plate 35 introduces a phase shift between reflected reference and reflected object beam portions or components of output beam 23. Quarter-wave plate 35 may be adjustable. Thus, for example, quarter-wave plate 35 could be adjusted, as needed, to introduce a target phase shift, for example approximately 90 degrees, between reflected reference and reflected object beam components of output beam 23. As described in more detail below, because two waves phase shifted with respect to one another are used, unwrapping of phase is facilitated. Such a phase shift is used for providing a quadrature output, as stated above. However, if outputs were viewed only in parallel, then quarter-wave plate 35 may be omitted. Notably, reflected reference and reflected object beam components of output beam 23, or output beam 24 for that matter, are still orthogonally polarized with respect to one another.

Polarizer 36 receives phase-shifted output beam 23 and assembles its reflected reference and reflected object beam components along a predetermined direction, for example approximately 45 degrees, to the vertical and horizontal axes of polarization of such components to provide assembled beam 38. As mentioned above HWP 22 is used to balance the beams, but if such beams were out of balance, a predetermined direction or angle may be selected or adjusted to enhance contrast of the interference. So, if reflected object and reference beam components are out of balance, then another angle may be selected to enhance the contrast by equalizing contributions of each such component in assembly of assembled beam 38. Assembled beam 38 may have interference between assembled reflected reference and reflected object beam components in response to displacement in optical path length 48 caused by surface defects or other surface inconsistencies, or from a nominal surface condition depending on reference plane selection, as mentioned above.

Polarizer 37 receives output beam 24 and assembles its reflected reference and reflected object beam components along a predetermined direction, for example approximately 45 degrees, to the vertical and horizontal axes of polarization of such components to provide assembled beam 39. Assembled beam 39 may have interference between assembled reflected reference and reflected object beam components in response to displacement in optical path length 48 caused by surface defects or other surface inconsistencies, or from a nominal surface condition, as mentioned above.

Assuming surface defects exist and are detected, reflected reference and reflected object beam components interfere in assembled beams 38 and 39 to produce moving fringes representing modulation of optical path length 48. Such moving fringes, which are temporal variation in light intensity, may be observed in both output beams 38 and 39 in parallel. Alternatively, such moving fringes may be observed in both assembled beams 38 and 39 in parallel and in phase quadrature.

Assembled beams 38 and 39 are provided to optical detectors 40 and 41, respectively. Optical detectors 40 and 41 may be photodiode detectors. Detectors 40 and 41 operate at a speed sufficient to capture fringes from assembled beams 38 and 39 and deliver respective voltages proportional to temporal light intensity change as signals 43 and 44, respectively, for subsequent digital signal processing by information processing system (IPS) 42.

Figure 6:
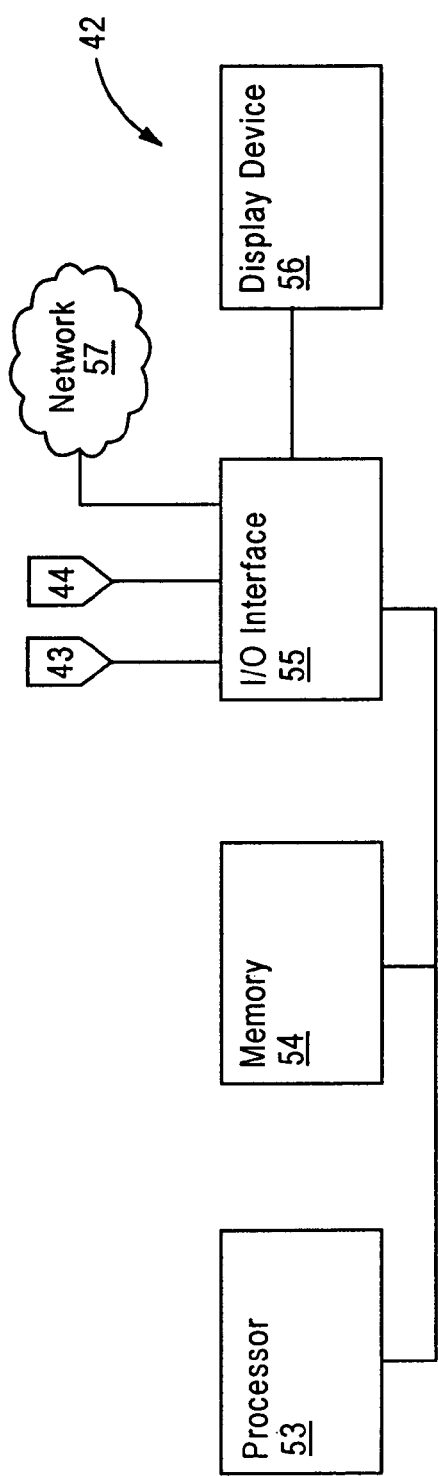
FIG. 6 is a block diagram of an exemplary portion of an embodiment of an information processing system configured to receive light intensity voltage signals in accordance with one or more aspects of the invention.

Referring to FIG. 6, there is shown a block diagram of an exemplary portion of an embodiment of an information processing system 42 configured to receive light intensity voltage signals 43 and 44 in accordance with one or more aspects of the present invention. Information processing system comprises processor 53, memory 54, input/output interface 55 and display device 56. Information processing system 42 may be a programmed personal computer or a digital oscilloscope or other known device for processing signals of the form of signals 43 and 44.

The above represents just one exemplary arrangement for obtaining circumferential surface topography measurements of a disk at the radius at the test point. The use of a quadrature phase shift interferometer 45, and in particular the profilometer of FIGS. 5 and 6, is but one example of a profilometer that may be employed with the present invention. Other types of profilometers, such as Candela profilometers or laser doppler vibrometers, may be employed without departing from the scope of the present invention.

The present invention provides for the removal of noise from the surface topography PSD spectrum. F(i) is the amplitude r.m.s. of surface topography that results from the square-root of the output of the single-sided scaled auto power spectrum of the surface topography; where, i=1, 2, 3, . . . n and n is the number of elements in the power spectrum. The integrated power density, P(k), over a frequency range of m to k, can then be obtained by calculation of the following equation:

$$P(k) = \sum_{i=m}^{k} F(i)^2 \qquad (1)$$

Figure 1:
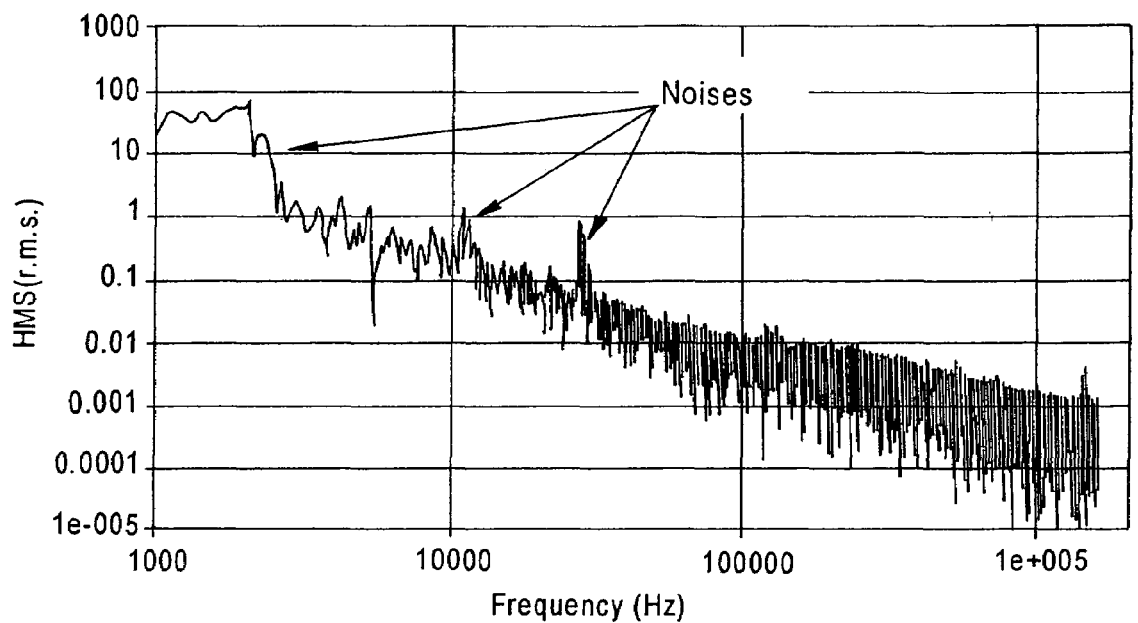
FIG. 1 is a plot of the frequency signal on the x-axis against HMS (r.m.s.) for an exemplary signal and exemplary measurement of disk surface topography.
Figure 2:
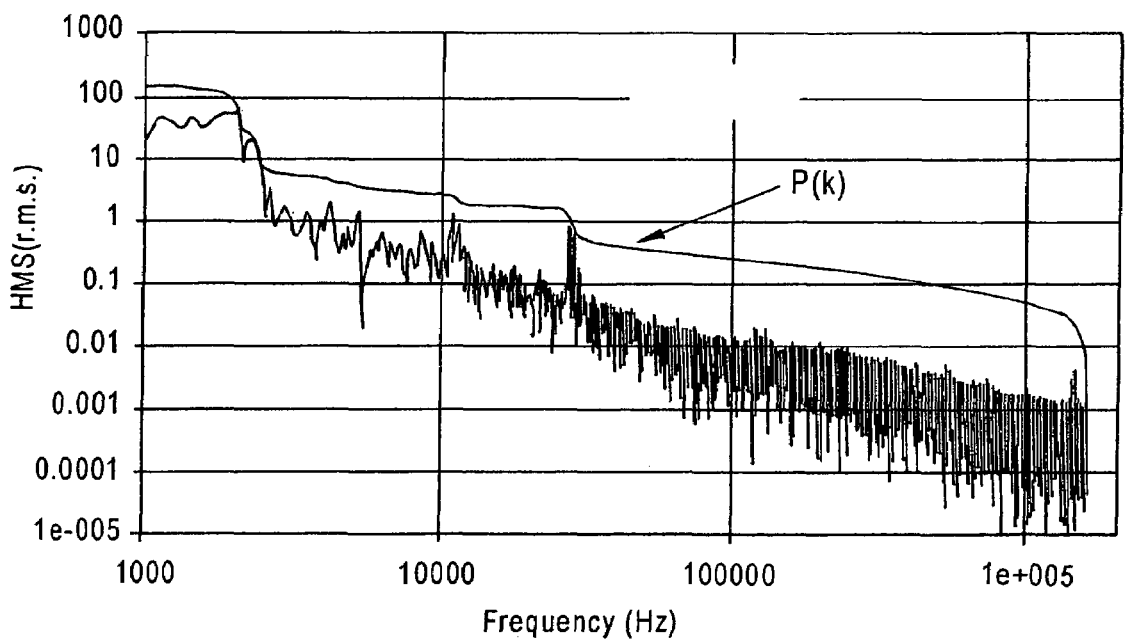
FIG. 2 shows the plot of the frequency of FIG. 1 with a plot of the integrated power density P(k) calculated in accordance with embodiments of the present invention.

Letting m=1, k=n, n−1, n−2, . . . 1, then a series of P(k) or the cumulative power spectral density distribution is generated. FIG. 2 shows the plot of the power spectral density distribution P(k), which is calculated from the spectrum, F(i) shown in FIG. 1. From FIG. 2, it is clear that the noise in the spectrum produces jumps or discontinuities in the curve P(k), such as those indicated by reference numeral 80. In the present invention, the discontinuities or steps in the cumulative PSD function P(k) are identified and removed. A noise free spectrum is then reconstructed from this corrected cumulative PSD function P(k).

Figure 3:
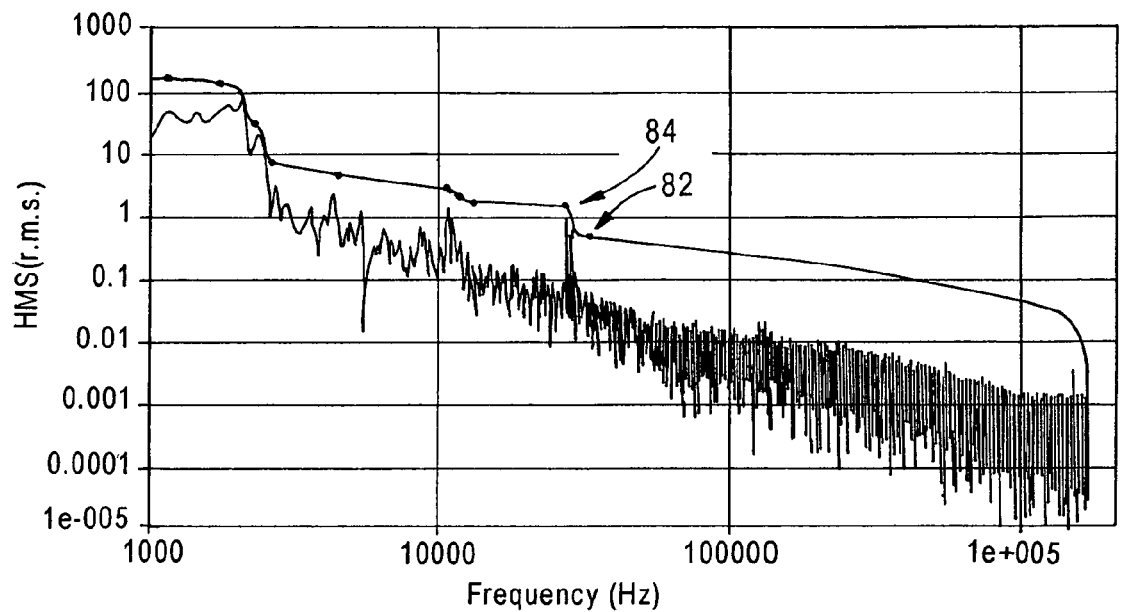
FIG. 3 depicts the frequency of FIG. 1 with the plot of the integrated power density with noise removed ($\hat{P}(k)$) in accordance with embodiments of the present invention.

Referring now to FIG. 3, the method of the present invention identifies the rising and ending points of the steps in the curve P(k). A slope detection method, for example, may be employed to find these rising and ending points. An exemplary rising point 82 and an ending point 84 are referenced in FIG. 3. Further rising and ending points in FIG. 3 are shown by circles on the cumulative PSD distribution P(k).

Hence, a number of steps are detected in the cumulative PSD function P(k). The first step height, considering the first step from the right of the right side of FIG. 2, is calculated. The calculation is based on the values of the points detected for rising point 82 and the ending point 84. After the calculation of the first step height, the P(k) segment, which is from the ending point 84 of the step to the end of the most left side of the cumulative PSD function P(k), is moved down vertically by this step height in order to remove the step. A second step height is then calculated, and the P(k) segment is again moved down vertically by the step height to remove this step. These actions are repeated until all of the steps in cumulative PSD function P(k) are removed.

Figure 4:
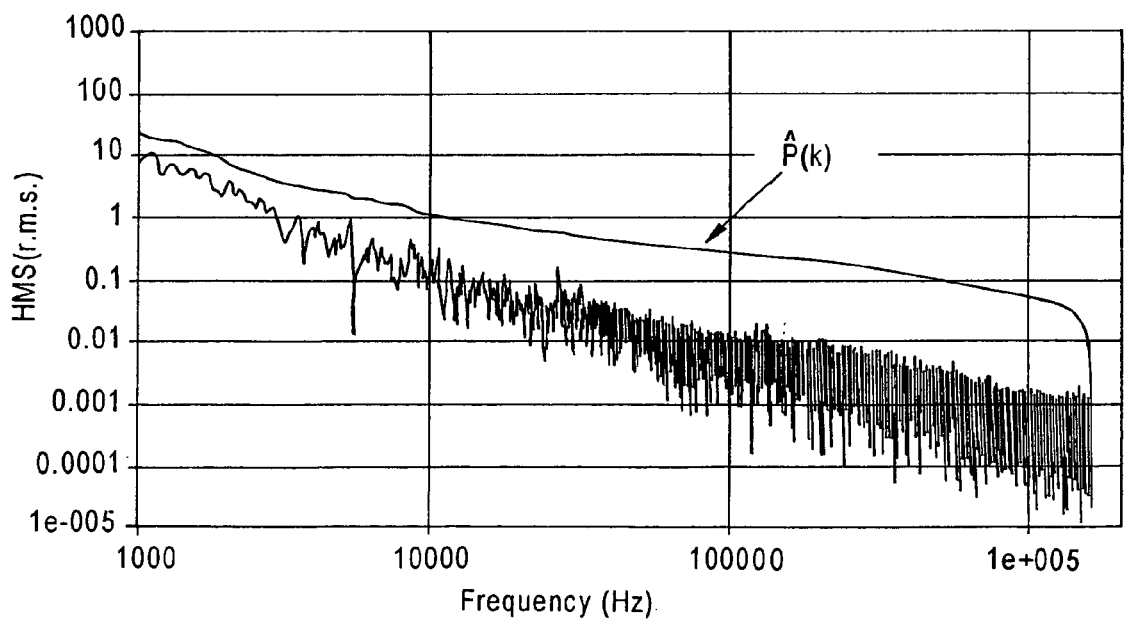
FIG. 4 depicts the amplitude r.m.s. of surface topography after the noise is removed from the signal in accordance with embodiments of the present invention.

Once all of these steps in cumulative PSD function P(k) are removed, the function $\hat{P}(k)$ is produced. The $\hat{P}(k)$ function is depicted in FIG. 4. From $\hat{P}(k)$, the amplitude r.m.s. of the surface topography after the noises are removed, $\hat{F}(k)$ is determined as follows.

$$\hat{F}(k) = \sqrt{\hat{P}(k) - \hat{P}(k-1)} \quad (2)$$

Figure 7:
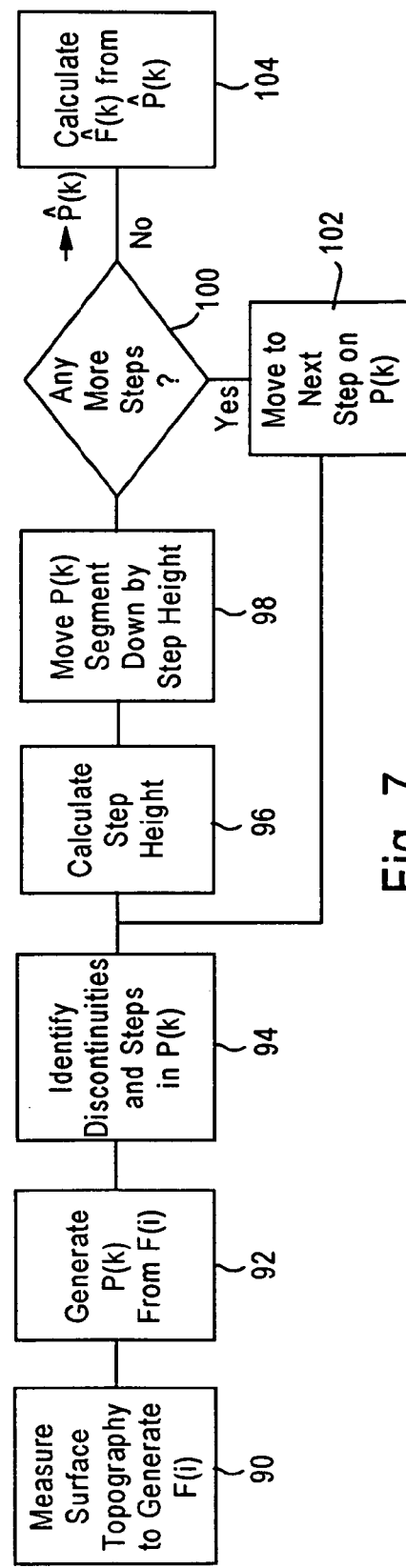
FIG. 7 is a flow chart of an exemplary embodiment of a method for determining the HMS_Wq in accordance with embodiments of the present invention.

A flow chart of an exemplary embodiment of a method for producing the amplitude r.m.s. of surface topography with noises removed is depicted in FIG. 7. In step 90, the surface topography of a disk is measured to produce the amplitude r.m.s. of surface topography F(i), such as the exemplary plot shown in FIG. 1. The measurements may be taken by any of a number of different profilometers, such as the QPSI of FIGS. 5 and 6, or other profilometers such as a Candela profilometer or laser doppler vibrometer.

From the amplitude r.m.s. signal F(i), the integrated power density P(k) is obtained by calculation in accordance with equation 1 described before. This is depicted in step 92. An exemplary curve P(k) representing the cumulative PSD function is depicted in FIG. 2, as described earlier.

In step 94, the discontinuities and steps in the cumulative PSD function P(k) are identified. A slope detection method may be employed to find the rising and ending points of the discontinuities or steps in the cumulative PSD function P(k).

Once the rising and endings points are found, and the discontinuities and steps are determined and identified in step 94, the step height of a step is calculated in step 96. On the first pass through the algorithm, the height of the first step is calculated in step 96. In subsequent passes through the process loop, heights of different steps are calculated.

In step 98, the P(k) segment is moved down vertically by the step height to remove the step. The P(k) segment that is moved is from the ending point of the step to the end of the left most side.

In step 100, it is then determined whether there are any more steps that have been identified in step 94. The answer is yes, step 102 causes the loop to move to the next step to calculate the step height in step 96 of this next step. When there are no more steps that have been identified, as determined in step 100, the amplitude r.m.s. of surface topography after the noises are removed, $\hat{F}(k)$, is calculated from the cumulative PSD function $\hat{P}(k)$ with noises removed. The equation employed to calculate $\hat{F}(k)$ is that described in equation 2, for example.

The noise removal method of FIG. 7 and described above relies on a particular condition being true. This condition is that the topography of the disk is produced by a random process, and as a consequence, is a cumulative PSD curve P(k) that is intrinsically free of steps or discontinuities.

Although the present invention has been described and illustrated in detail, it is to be clearly understood that the same is by way of illustration and example only and is not to be taken by way of limitation, the scope of the present invention being limited only by the terms of the appended claims.

What is claimed is:

1. A method of measuring head-media spacing modulation (HMS_Wq), comprising the steps:
   measuring surface topography of a disk;
   generating a cumulative power spectral density (PSD) distribution from the measured surface topography of the disk;
   identifying discontinuities and steps in the cumulative PSD distribution; and
   removing discontinuities and steps in the cumulative PSD distribution.

2. The method of claim 1, further comprising generating an initial frequency spectrum from the measured surface topography of the disk, the step of generating a cumulative power spectral density includes calculating the cumulative PSD distribution from the initial frequency spectrum.

3. The method of claim 2, wherein the step of calculating the cumulative PSD distribution is obtained according to the following equation:

$$P(k) = \sum_{i=m}^{k} F(i)^2,$$

where:
P(k) is the cumulative PSD distribution; F(i) is the initial frequency spectrum, m=1, and k=n, n-1, n-1, . . . 1.

4. The method of claim 3, wherein the step of identifying includes determining rising and ending points of steps in P(k).

5. The method of claim 4, wherein the step of determining rising and ending points comprises slope detection.

6. The method of claim 5, wherein the step of removing involves calculating step heights based on the determined rising and ending points of steps.

7. The method of claim 6, wherein the step of removing further includes moving P(k) segments vertically by amounts equal to adjacent step heights to generate a corrected $\hat{P}(k)$.

8. The method of claim 7, further comprising generally $\hat{F}(k)$, the amplitude r.m.s. of surface topography of the disk with noise removed, from the corrected $\hat{P}(k)$.

9. The method of claim 8, wherein the step of generating $\hat{F}(k)$ is determined according to the equation:

$$\hat{F}(k) = \sqrt{\hat{P}(k) - \hat{P}(k-1)}$$

where K=n, n-1, n-2, . . . 1 and $\hat{P}(O)$=0.

10. The method of claim 1, further comprising determining amplitude r.m.s. of surface topography of the disk from the cumulative PSD distribution after the discontinuities and steps are removed from the cumulative PSD distribution.

11. The method of claim 10, wherein the step of measuring surface topography includes using at least one of a Candela profilometer, a quadrature phase shift interferometer or a laser doppler vibrometer.

12. An arrangement for measuring head-media spacing modulation (HMS_Wq), comprising:
a measurement device that performs surface topography measurements of a disk; and
a processor configured to: determine an initial surface topography power spectral density (PSD) spectrum based on the topography measurements; remove noise from the initial PSD spectrum; generate an amplitude r.m.s. of surface topography $\hat{F}(k)$ from the PSD spectrum with noise removed; and calculate HMS_Wq from $\hat{F}(k)$.

13. The arrangement of claim 12, wherein the processor is further configured to determine an initial amplitude r.m.s. of surface topography F(i) from the surface topography measurements of the disk.

14. The arrangement of claim 13, wherein the processor is further configured to determine the initial PSD spectrum by forming an integrated power density P(k) according to the equation:

$$P(k) = \sum_{i=m}^{k} F(i)^2,$$

where m=1, and k=n, n−1, n−2, . . . 1.

15. The arrangement of claim 14, wherein the processor is further configured to determine rising and ending points of steps in P(k) using slope detection.

16. The arrangement of claim 15, wherein the processor is further configured to calculate step heights based on the rising and ending points of the steps.

17. The arrangement of claim 16, wherein the processor is further configured to move P(k) segments vertically by amounts equal to adjacent step heights to remove the noise from the initial PSD spectrum and thereby generate a corrected PSD spectrum $\hat{P}(k)$.

18. The arrangement of claim 17, wherein the processor is further configured to generate $\hat{F}(k)$ according to the equation:

$$\hat{F}(k) = \sqrt{\hat{P}(k) - \hat{P}(k-1)}$$

where k=n, n−1, n−2, . . . 1 and $\hat{P}(O)$=0.

19. An arrangement for measuring surface topography of a disk, comprising:
a measurement device to obtain surface topography measurements of a disk surface; and
means for determining head-media spacing modulation (HMS_Wq) with noise removed.

20. The arrangement of claim 19, wherein the means for determining includes a processor configured to: determine an initial frequency spectrum from the surface topography measurements; calculate an initial integrated power spectral density distribution from the initial frequency spectrum; remove the noise from the initial integrated power spectral density distribution to create a corrected power spectral density distribution; and to generate a corrected frequency spectrum from the corrected power spectral density distribution.

* * * * *